US012226356B1

(12) United States Patent
Wilson et al.

(10) Patent No.: US 12,226,356 B1
(45) Date of Patent: Feb. 18, 2025

(54) ADJUSTABLE POSTERIOR HEAD SUPPORT

(71) Applicant: Turn Medical, LLC, San Antonio, TX (US)

(72) Inventors: Kevin S. Wilson, San Antonio, TX (US); Eric W. Barta, Castle Hills, TX (US); Christopher T. Niederkrom, San Antonio, TX (US)

(73) Assignee: Turn Medical, LLC, San Antonio, TX (US)

( * ) Notice: Subject to any disclaimer, the term of this patent is extended or adjusted under 35 U.S.C. 154(b) by 0 days.

(21) Appl. No.: 17/723,349

(22) Filed: Apr. 18, 2022

Related U.S. Application Data

(60) Provisional application No. 63/176,150, filed on Apr. 16, 2021.

(51) Int. Cl.
*A61G 7/008* (2006.01)
*A61G 7/05* (2006.01)
*A61G 13/04* (2006.01)

(52) U.S. Cl.
CPC .......... *A61G 7/008* (2013.01); *A61G 7/0507* (2013.01); *A61G 13/04* (2013.01); *A61G 2200/325* (2013.01)

(58) Field of Classification Search
None
See application file for complete search history.

(56) References Cited

U.S. PATENT DOCUMENTS 3,302,218 A 2/1967 Stryker
3,681,797 A 8/1972 Messner
4,033,339 A * 7/1977 Roberts ................ A61G 13/121 602/18
4,391,009 A 7/1983 Schild
4,729,598 A 3/1988 Hess
4,947,496 A 8/1990 Connolly
5,249,320 A 10/1993 Moretz
5,412,821 A 5/1995 Wilkinson
5,487,196 A 1/1996 Wilkinson
5,794,288 A 8/1998 Soltani
5,870,785 A 2/1999 Hoorens
5,882,349 A 3/1999 Wilkerson
5,926,884 A 7/1999 Biggie
6,065,165 A 5/2000 Delk
6,108,838 A 8/2000 Connolly
6,212,718 B1 4/2001 Stolpmann
6,282,736 B1 9/2001 Hand
6,367,106 B1 4/2002 Gronsman
6,499,160 B2 12/2002 Hand
6,526,610 B1 3/2003 Hand
6,566,833 B2 5/2003 Bartlett
6,609,260 B2 8/2003 Hand
6,619,382 B1 9/2003 Ichigaya
6,671,905 B2 1/2004 Bartlett
(Continued)

FOREIGN PATENT DOCUMENTS

DE 202005007453 U1 10/2005
EP 1987806 6/2009
(Continued)

*Primary Examiner* — Adam C Ortiz
(74) *Attorney, Agent, or Firm* — Pizarro Allen PC

(57) ABSTRACT

Support assemblies for supporting the head of a patient during rotation are described. The support assemblies may include a posterior head support panel that allows for access to the patient.

22 Claims, 6 Drawing Sheets

(56) References Cited

U.S. PATENT DOCUMENTS

| | | | |
|---|---|---|---|
| 6,691,347 B2 | 2/2004 | Hand | |
| 6,701,553 B1 | 3/2004 | Hand | |
| 6,701,556 B2 | 3/2004 | Romano | |
| 6,715,169 B2 | 4/2004 | Niederkrom | |
| 6,728,983 B2 | 5/2004 | Bartlett | |
| 6,817,363 B2 | 11/2004 | Biondo | |
| 6,862,759 B2 | 3/2005 | Hand | |
| 6,862,761 B2 | 3/2005 | Hand | |
| 6,874,181 B1 | 4/2005 | Vijayendran | |
| 6,934,986 B2 | 8/2005 | Krywiczanin | |
| 7,017,211 B2 | 3/2006 | Krywiczanin | |
| 7,137,160 B2 | 11/2006 | Hand | |
| 7,191,480 B2 | 3/2007 | Romano | |
| 7,191,482 B2 | 3/2007 | Romano | |
| 7,219,379 B2 | 5/2007 | Krywiczanin | |
| 7,322,059 B2 | 1/2008 | Hornbach | |
| 7,455,744 B2 | 11/2008 | Mileti | |
| 7,469,432 B2 | 12/2008 | Chambers | |
| 7,469,436 B2 | 12/2008 | Meyer | |
| 7,472,440 B2 | 1/2009 | Bartlett | |
| 7,478,869 B2 | 1/2009 | Lazanja | |
| 7,480,953 B2 | 1/2009 | Romano | |
| 7,578,552 B2 | 8/2009 | Bajic | |
| 7,617,555 B2 | 11/2009 | Romano | |
| 7,712,164 B2 | 5/2010 | Chambers | |
| 7,914,611 B2 | 3/2011 | Vrzalik | |
| 7,937,791 B2 | 5/2011 | Meyer | |
| 7,966,680 B2 | 6/2011 | Romano | |
| 7,992,239 B2 | 8/2011 | Hornbach | |
| 8,011,041 B2 | 9/2011 | Hann | |
| 8,118,920 B2 | 2/2012 | Vrzalik | |
| 8,372,182 B2 | 2/2013 | Vrzalik | |
| 8,601,620 B2 | 12/2013 | Romano | |
| 8,856,993 B2 | 10/2014 | Richards | |
| 8,893,338 B2 | 11/2014 | McCausland | |
| 8,997,287 B2 | 4/2015 | Lanning | |
| 9,009,892 B2 | 4/2015 | Lachenbruch | |
| 9,131,780 B2 | 9/2015 | Lachenbruch | |
| 9,254,231 B2 | 2/2016 | Vrzalik | |
| 9,433,300 B2 | 9/2016 | Gibson | |
| 9,462,893 B2 | 10/2016 | Romano | |
| 9,463,124 B2 | 10/2016 | Lachenbruch | |
| 9,538,853 B2 | 1/2017 | Vrzalik | |
| 9,730,847 B2 | 8/2017 | Lachenbruch | |
| 9,835,344 B2 | 12/2017 | Vrzalik | |
| 9,907,408 B2 | 3/2018 | Vrzalik | |
| 9,913,770 B2 | 3/2018 | Lachenbruch | |
| 10,172,470 B1 | 1/2019 | Vrzalik | |
| 10,265,231 B2 | 4/2019 | O'Reagon | |
| 2002/0138905 A1 | 10/2002 | Bartlett | |
| 2002/0138906 A1 | 10/2002 | Bartlett | |
| 2004/0168253 A1 | 9/2004 | Hand | |
| 2004/0226091 A1 | 11/2004 | Hand | |
| 2005/0022308 A1 | 2/2005 | Totton | |
| 2005/0081300 A1 | 4/2005 | O'Reagan et al. | |
| 2005/0086739 A1 | 4/2005 | Wu | |
| 2005/0229317 A1 | 10/2005 | Heiser | |
| 2006/0010608 A1 | 1/2006 | DeFranks | |
| 2006/0016007 A1 | 1/2006 | Hornbach | |
| 2006/0112491 A1 | 6/2006 | Buehner | |
| 2006/0112826 A1 | 6/2006 | Ichigaya | |
| 2007/0261548 A1 | 11/2007 | Vrzalik | |
| 2009/0056030 A1 | 3/2009 | Bolden | |
| 2010/0146709 A1 | 6/2010 | Lafleche | |
| 2010/0274331 A1 | 10/2010 | Williamson | |
| 2011/0024076 A1 | 2/2011 | Lachenbruch | |
| 2011/0308020 A1 | 12/2011 | Vrzalik | |
| 2013/0074272 A1 | 3/2013 | Lachenbruch | |
| 2013/0198955 A1 | 8/2013 | Lishnevsky | |
| 2013/0212808 A1 | 8/2013 | Lachenbruch | |
| 2013/0298330 A1 | 11/2013 | Lachenbruch | |
| 2014/0165287 A1* | 6/2014 | Jessen | A61G 7/1067 5/86.1 |
| 2017/0007482 A1 | 1/2017 | McKnight | |
| 2019/0099012 A1* | 4/2019 | Zhang | A47D 15/00 |
| 2021/0330537 A1* | 10/2021 | Lim | A61G 13/1245 |
| 2022/0265501 A1* | 8/2022 | Elia | A61G 13/0036 |

FOREIGN PATENT DOCUMENTS

| | | |
|---|---|---|
| EP 3424478 | 1/2019 | |
| WO 1997018157 | 5/1997 | |
| WO WO 97/22323 | 6/1997 | |

* cited by examiner

ADJUSTABLE POSTERIOR HEAD SUPPORT

CROSS-REFERENCE TO RELATED APPLICATIONS

This application claims priority to U.S. Provisional Patent Application No. 63/176,150 titled "Head Support Assemblies with an Adjustable Posterior Head Support and Related Therapeutic Apparatuses" filed Apr. 16, 2021. The full disclosure of the aforementioned patent application is herein fully incorporated by reference.

FIELD

This invention relates to patient head support and access for prone therapy.

BACKGROUND

Therapeutic beds for prone therapy typically include support for the front, back, left and right sides of a patient's head to ensure proper support during proning. Such support typically limits access to the posterior of the patient's head. There remains a need for ready access to the posterior of the patient's head while the patient is prone or otherwise tilted for a variety of purposes, such as positioning a patient for a medical procedure, reducing pressure on the patient's face and providing improved ventilation cooling.

SUMMARY

A therapeutic bed comprising a frame configured to rotate a patient between a supine position and a prone position; a chassis coupled to the frame, the chassis being configured to support the head of the patient; and a panel translatably and pivotably coupled to the chassis so as to permit movement of the panel between a closed position in which a surface of the panel may support the posterior of a patient head, and an open position.

A therapeutic bed comprising a frame configured to rotate a patient between a supine position and a prone position, a head support chassis coupled to the frame, and a panel translatably and/or pivotably coupled to the chassis so as to permit movement of the panel between a closed position in which a surface of the panel may support the posterior of a patient head and an open position in which the posterior of a patient head is exposed.

A support pack assembly configured for supporting a patient's head during patient rotation, the support pack assembly comprising a chassis; and a posterior head panel configured to support a posterior portion of the patient's head, the posterior head support being adjustably mounted to the supporting chassis so as to allow for adjustment between a closed position and an open position, wherein the patient's head is supported for rotation in each of said closed position and said open position.

A therapeutic apparatus for supporting a patient during rotation, the therapeutic apparatus comprising a rotatable patient support frame; and a support pack assembly connected to the rotational support frame and configured for supporting a patient's head during patient rotation, the support pack assembly comprising a chassis and a posterior head panel configured to support a posterior portion of the patient's head, the posterior head support being adjustably mounted to the supporting chassis so as to allow for adjustment between a closed position and an open position.

DETAILED DESCRIPTION

This disclosure is directed to head support packs for therapeutic beds configured for prone therapy. To provide context for describing the structure and function of various embodiments of face support packs, the disclosure turns first to an overview of an embodiment of a therapeutic bed in which a face support pack may be suitably provided.

Therapeutic Bed

Figure 1:
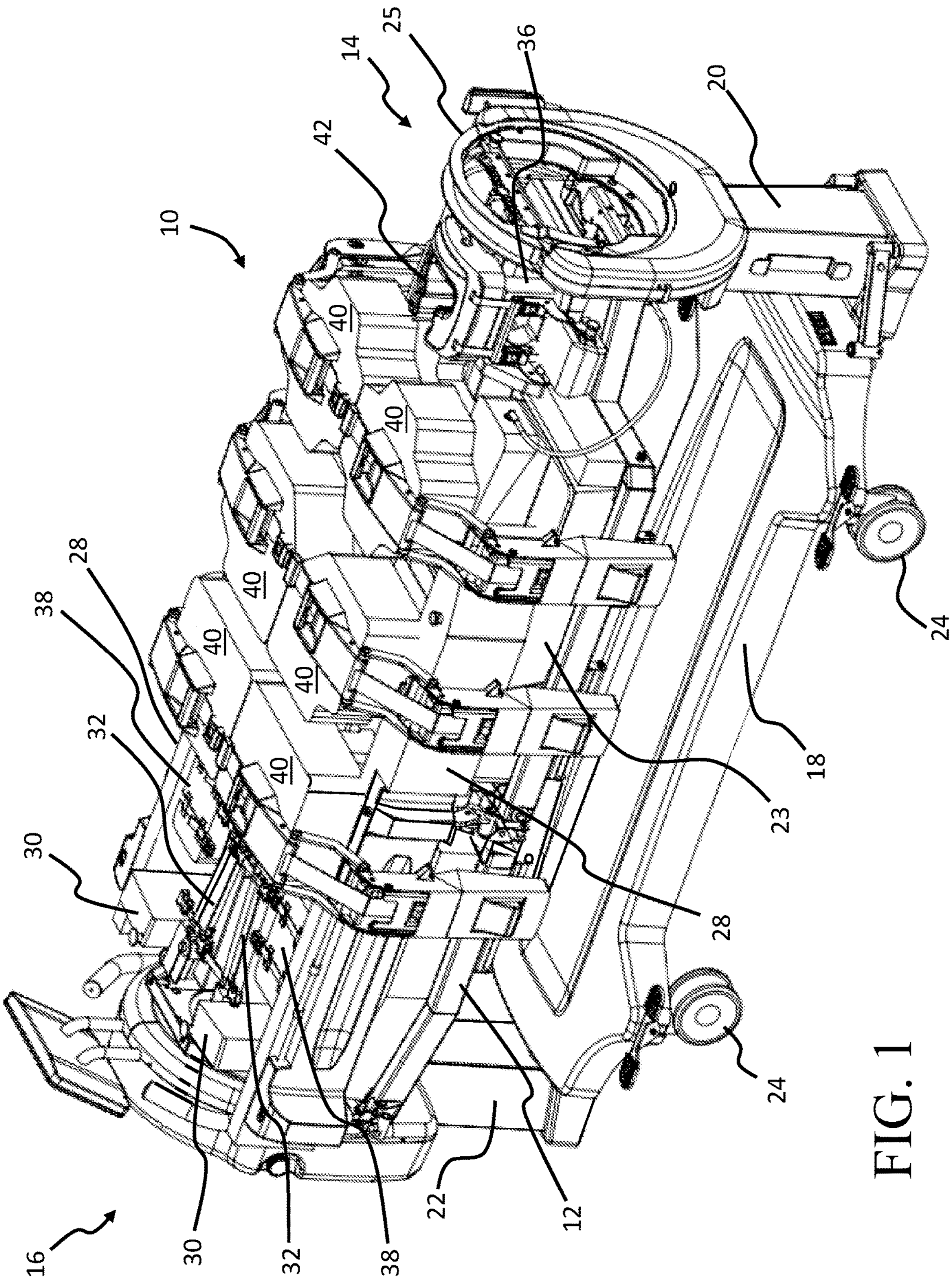
FIG. 1 illustrates an embodiment of a therapeutic bed configured for prone therapy.

FIG. 1 illustrates an embodiment of a therapeutic bed 10 configured to support a patient (not shown) for prone therapy and/or kinetic therapy. Therapeutic bed includes a patient support frame 12 having a head end 14 and a foot end 16. The patient support frame is coupled to a caster frame 18 by a first lift column 20 at the head end and by a second lift column 22 at the foot end. The caster frame may be supported by a plurality of casters 24 for bed mobility.

The therapeutic bed embodiment of FIG. 1 may move a patient through primarily two therapeutic modes of movement: a rotational mode and a tilt mode. To provide a rotational mode of movement, the patient support frame may be rotated about a long axis extending through the foot end and the head end of the patient support frame. The rotational mode of movement permits a patient to be rotated from a supine (face up) orientation to a prone (face down) orientation. The rotational mode of movement may further permit a patient to be oscillated through a range of angular positions in either or both of the supine or prone orientations. The rotational mode of movement may further permit rotation through 360° or more or less than 360°.

To permit rotational movement, the patient support frame may be rotatably coupled to the lift columns. For example, the foot end of the patient support frame may be coupled to lift column 22 by any suitable means, such as through a plate or saddle (not shown). Other suitable means for providing rotatable coupling between the lift column 22 and patient support frame may be used, such as those described in U.S. Pat. No. 6,862,759, for example, which is herein incorporated by reference. The head end of the patient support frame may comprise a hoop 25, which may be coupled to a lift column 20 using any suitable means. For example, the patient support frame may rest on a roller support coupled to a saddle (not shown) with the saddle coupled to the lift column 20. A drive system (not shown), such as an electrical motor and drive belt, and electronic controls may be used to selectively rotate the patient support frame. Of course, other suitable means for rotatably coupling the patient support frame and lift column 20 may be used. In some modes of operation, the patient support frame may be manually rotated.

To provide a tilt mode of movement, the length of each lift column may be independently adjusted so as to raise and lower the head end of the patient support frame independently of the foot end, or to raise and lower the foot end of the patient support frame independently of the head end. Furthermore, the length of each lift column may be adjusted so as to raise or lower the entire patient support frame with respect to the caster frame. That is, the distance between either or both end of the patient support frame and the caster frame may be adjusted. To permit tilt movement, lift column height may be adjusted by any suitable mechanism, such as by hydraulics, screw, gas spring, coil spring, ratchet or removable pin.

Patient Constraint

When the patient support frame is oriented to support a patient in a supine position, the patient may rest on one or more patient support pads 23 disposed on the patient support frame 12. However, when the patient support frame is moved through one or more modes of movement, the patient must be constrained from sliding or falling from the patient support frame. A variety of packs may be provided to constrain a patient during bed movement.

A plurality of lateral packs may constrain the patient's legs, torso, arms and head from lateral movement with respect to the patient support surface. Such lateral packs may include, for example, side support packs 28, foot packs 30, abductor packs 32, and head packs 36.

A plurality of prone packs may prevent a patient from falling from the bed when the patient is rotated to a prone position. Such prone packs may include, for example, leg packs 38, torso or thigh packs 40 and a head pack 42.

The term "pack" as used herein refers to a structure that is firm enough to substantially maintain its shape while supporting the patient's body but is also soft so as to comfortably support the patient's body. A pack may, for example, be comprised of a rigid support panel or other structure surrounded by a padding. A pack may be comprised of one or more layers. A pack may comprise a single type of padding. Alternatively, a pack may comprise several different padding materials such as may be used such as to provide a desired level of stiffness and softness in different parts of a pack. For example, a pack may be comprised of materials with more than one spring rate or initial force deflection rating so as to control a level of immersion of the pack around the patient's body. A pack may be shaped to receive a part of the patient's body. For example, a support pack may be generally shaped to contour a patient's legs, forehead, cheeks, or other body part against which it is designed to be disposed. In some embodiments, a pack may be shaped and/or made of materials with controlled properties (e.g., initial force deflection, spring rate, and other properties) so as to reduce any shearing stresses that tend to be formed on the patient's skin when a patient's body is immersed in the pack. A pack may, for example, be filled with a pressurized gas (such as air), foam, a gel, a viscous fluid, or another suitable material.

Patient Access

When the patient support frame is rotated to orient a patient in the prone position, a caregiver may require access to the patient through the patient support frame. The patient support frame may be provided with panels that a caregiver may open to allow access to the patient's body. Access may further be provided to the back of the patient's head, as further described herein.

In view of the foregoing context, a more detailed description of a prone head support with patient access may now be provided. However, the foregoing embodiment of therapeutic bed and various features and functions thereof should not be interpreted as limiting. Any prone head support with patient access as described herein may be used with any therapeutic bed in which a patient may be positioned or placed in a prone or face down position.

Figure 2:
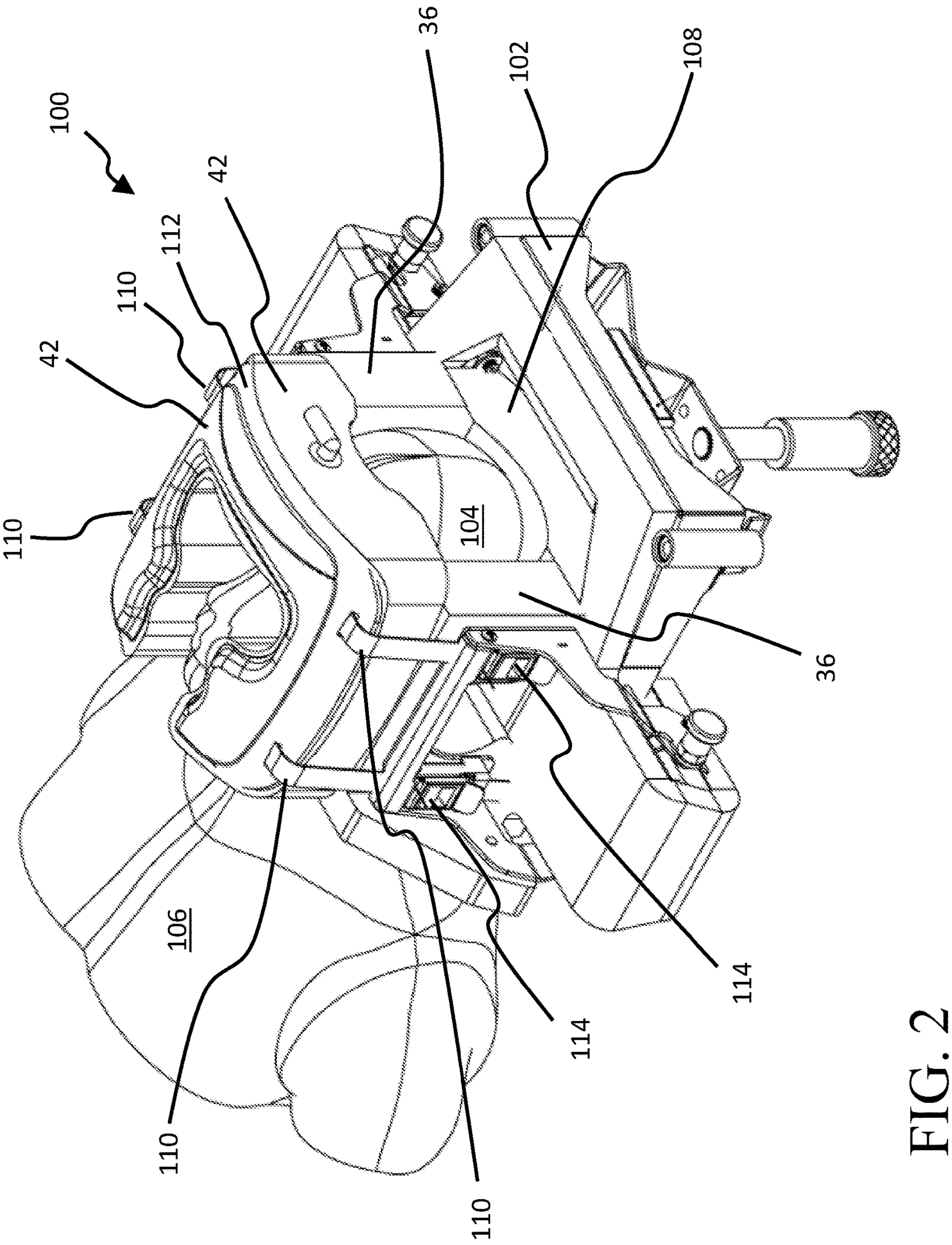
FIG. 2 illustrates an embodiment of a head support assembly shown with a patient in a supine or face up position.

As may be seen in the embodiment of FIG. 2, a front head pack 42 may be provided as part of a head pack support assembly 100. The head pack support assembly 100 may comprise a chassis 102 configured to releasably constrain the head 104 of a patient 106. The chassis may support the front head pack 42, one or more lateral head packs 36, and a posterior head pack 108. The head packs 36, 42, 108 may be releasably coupled to the chassis by a shroud 112 retained by a plurality of straps 110 adjustably held by buckles 114. When the front head pack 42 is coupled to the chassis 102 to constrain a patient's head, the retaining straps 110 might be overtightened, causing excessive pressure on the patient's face. In such circumstances, an access panel 120 (shown in FIG. 3) may be provided in the chassis 102 to relieve pressure on the patient's face and to permit access to the posterior of the patient head. Relieving pressure on the patient's face will reduce risk of skin breakdown at the skin-pack interface. Access may allow the patient's head to cool down and provide a path for introduction of patient lines and tubes.

Figure 3:
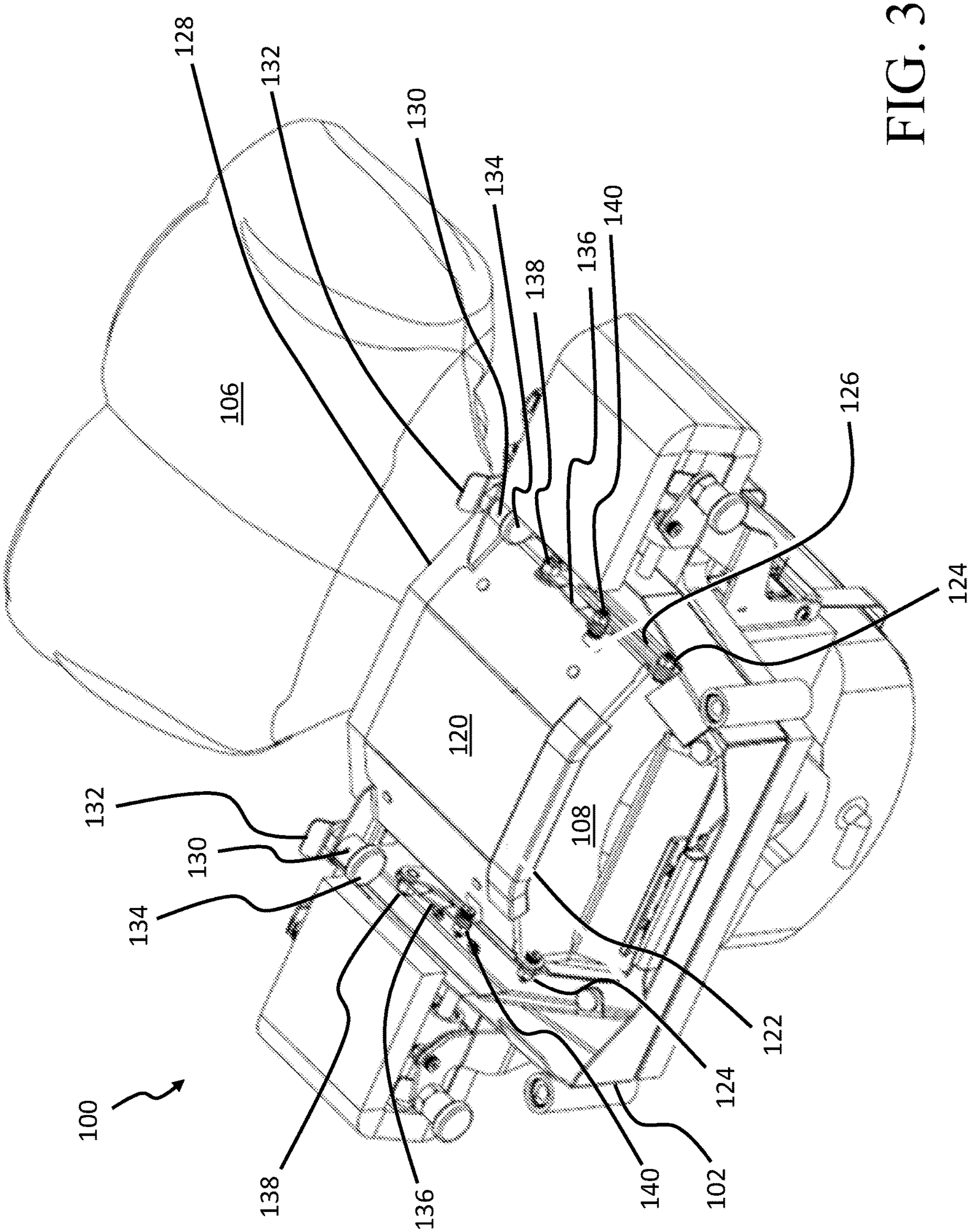
FIG. 3 illustrates a head support assembly shown with a patient in a prone or face down position and an access panel in a closed position.

As may be seen in the embodiment of FIG. 3, a patient may be placed in a prone position such that the patient's head is contained face down in the head pack support assembly 100. The posterior head pack 108 is mounted to a posterior panel 120 coupled to the chassis. The panel 120 is shown in a closed position such that the posterior head pack 108 broadly engages the posterior of the patient's head. The head end 122 of the panel 120 is translatably and pivotably coupled to the chassis 102 by pivot pins 124 that may slide and pivot in slots 126 provided in the chassis. The slots 126 may form a straight path or a curved path or stepped or toothed path or any combination thereof. The shoulder end 128 of the panel 120 is releasably secured to the chassis 102 by pull pins 130 mounted to the panel 120 and engaging tabs 132 extending from the chassis 102. The pull pins 130 may be manually retracted from engagement with the tabs 132 by knobs 134 that may be grasped by a caregiver. The panel 120 may be further coupled to the chassis through a linkage formed by a link 136 pivotably coupled at a first end 140 to the chassis and at a second end 138 to the panel.

Figure 4:
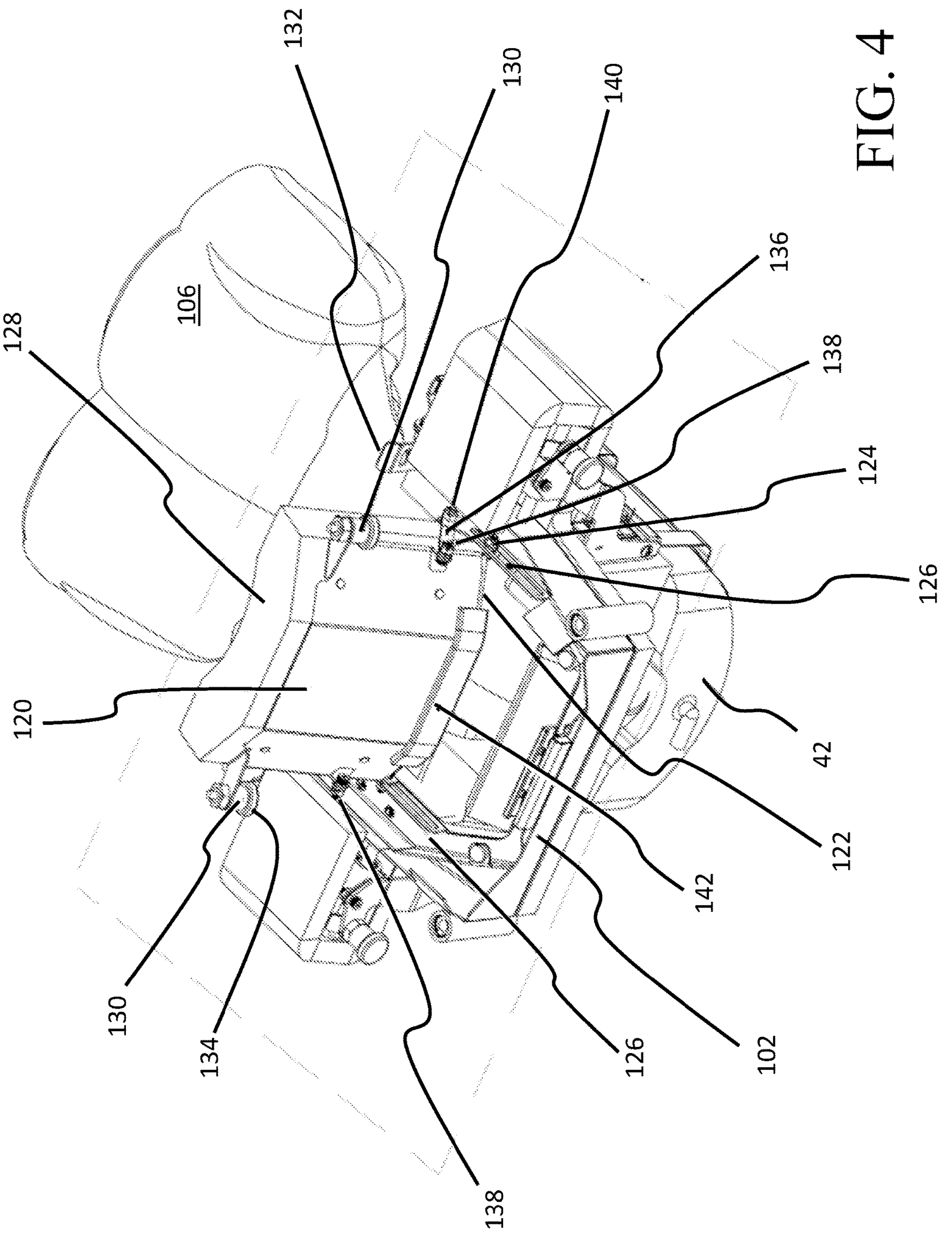
FIG. 4 illustrates a head support assembly shown with a patient in a prone or face down position and an access panel in an open position.

As may be seen in FIG. 4, the shoulder end 128 of the panel 120 may be pivoted away from the chassis 102 to an open position by retracting the pull pins 130 from the tabs 132 and urging the shoulder end 128 of the panel 120 away from the chassis. The head end 122 of the panel 120 may be simultaneously urged toward the tabs 132, thereby causing the pivot pins 124 to pivot within the slots 126 and slide along the slots toward the tabs 132. The link 136 limits the path of the panel 120 as the panel pivots through the linkage until the head end 122 of the panel is at or near the posterior of the patient head. In the embodiment shown in FIG. 4, a pad 142 may be disposed on the edge of the head end 122 of the panel 120 to provide a comfortable interface between the edge and the patient's head in the event of contact therebetween. Typically, the edge of the panel 120 will not contact the patient's head if the patient is facing downwards when the panel is opened. With the panel 120 in an open position (FIG. 4), however, the edge of the panel may support the patient head if a caregiver inadvertently rotates the patient to a supine position without moving the panel 120 to a closed position.

In other embodiments, the pivot pins, slots, linkage, pull pins and tabs may be disposed so as to permit the head end of the panel to be pivoted away from the chassis rather than the shoulder end of the panel. Such a configuration would essentially mirror the configuration of FIGS. 3 and 4. In such a configuration, the pad may be disposed on the edge of the shoulder end of the panel.

As may be readily understood, pivotal coupling between panel and chassis may be provided by any suitable mechanism, such as a rod and sleeve, ball and socket, roller, U-joint or hinge. Translational coupling between panel and chassis may likewise be provided by any suitable connection, such as rod and sleeve, and roller and track. The panel may be secured to the chassis by any suitable mechanism, such as ball and détente, magnets, frictional engagement between panel and chassis, catch, one or more straps, and the like.

In yet other embodiments, one or more springs or elastic members may be used to resist rotation of the panel from a closed position to an open position. For example, a spring may be disposed at each slot so that the pivot pin compresses the spring as it slides along the slot. The slot may be provided with a catch to engage the pivot pin to prevent it from sliding along the slot by force of the spring. When the pivot pin is released form the catch, the spring will urge the pin to return to its original position, thereby rotating the panel to a closed position. Similarly, a spring or elastic member may be used to resist rotation of the panel with respect to one or more pivot points between panel and chassis. In other embodiments, the slot may be curved so that the pivot pin slides along a curved path at each end of which the spring is less compressed than at a midpoint of the curved path. In yet other embodiments, the slot may form a toothed path that will allow the pivot pin to engage the slot in ratchet fashion.

In some embodiments, the panel may be moved from closed position to open position and back by manual efforts. In other embodiments, a powered actuator may be used to move the panel.

Figure 5:
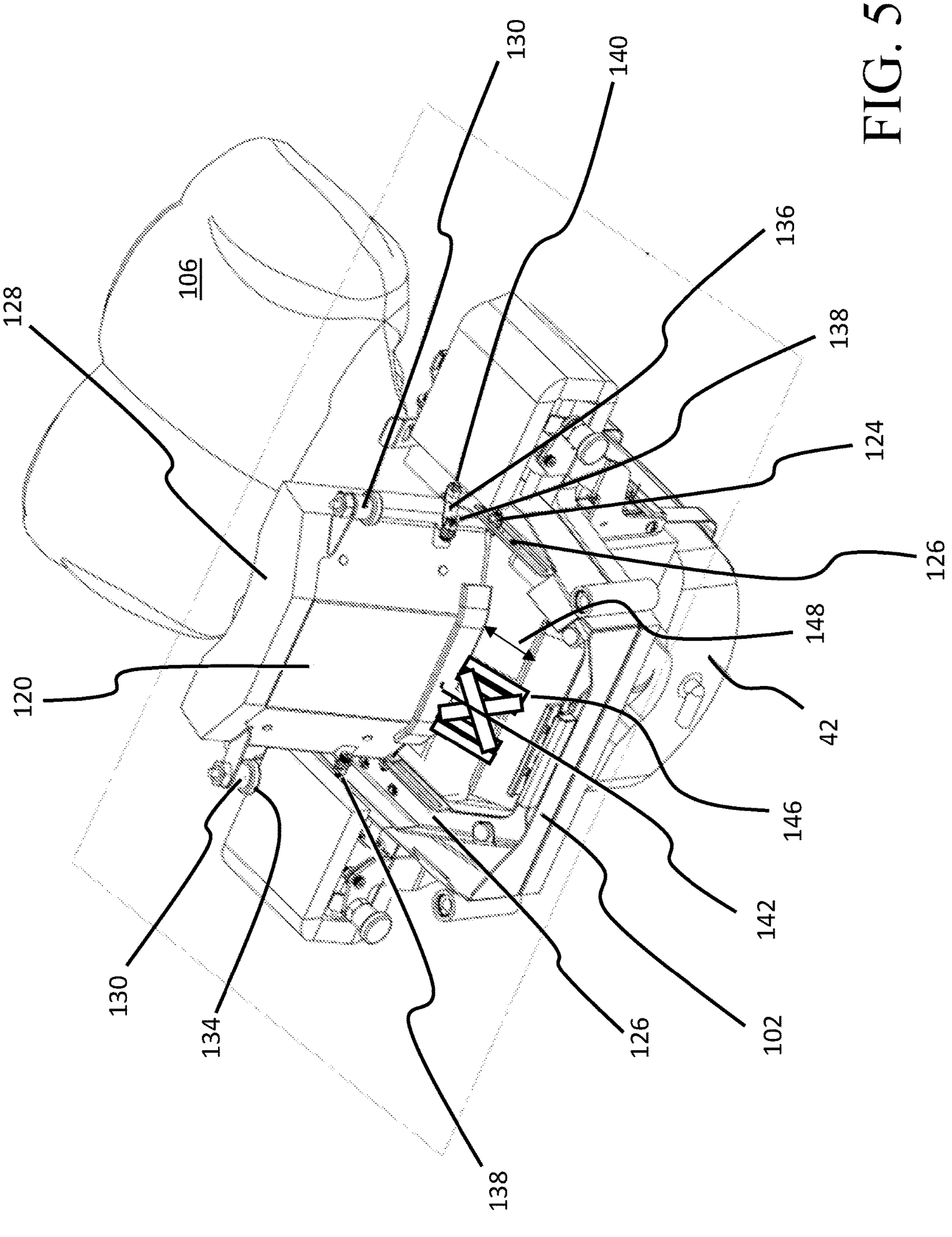
FIG. 5 illustrates a head support assembly shown with a patient in a prone or face down position and having flexible material extended across a gap when an access panel is an open position.

In some embodiments, a head pack support assembly herein may be designed to safely support the patient even if a caregiver inadvertently rotates the patient while the panel is an open position. For example, when the panel is opened a support structure such as a pad may be positioned to help support the patient's head. In some embodiments, a net or strap may be used in conjunction with or be part of head pack support assembly so that the patient's head may become supported by the net or strap even if a support pack assembly is inadvertently or purposefully rotated while in an open position. For example, as may be seen in the embodiment of FIG. 5, one or more flexible straps 146 or net may be attached to the chassis and head end of the panel. When the panel moves to the open position, the straps may be extended or unfold across the gap 148 between the edge of the head end of the panel and the chassis. The net or straps may, for example, extend from the tilted panel 120 to the chassis 102 so as to span or fill the gap 148. Alternatively, the flexible strap or net 146 may extend across different parts of the chassis 102 so as to extend across the entire area filled by the panel 120. For example, the flexible strap 146 may extend laterally from left to right across the chassis 102.

In yet other embodiments, a head pack support assembly may be configured so that a patient may be rotated with at least a portion of the back of the patient's head and/or neck exposed. The patient's head may remain supported so that any critical lines (e.g., intubated breathing lines in the patient's airways) will not be at risk of coming dislodged during rotation.

In some embodiments, a head pack support assembly as described herein may be configured to automatically adjust the position of a patient's head when a posterior head support is adjusted to an open position.

For example, a panel in an open position may not be directly in contact with the posterior of the patient head or may be in light contact with the posterior of the patient head. A panel may thus be positioned suitably close to the patient so that the patient's head will comfortably rest on the edge of the panel head end should the patient be rotated with the panel in the open position. Thus, any pre-loaded stress, such as may have been placed on the patient's forehead or skin of the cheeks when fastening a head pack to the chassis, may be substantially released. In addition to releasing tension on the patient's face, opening the panel will improve ventilation cooling or allow better positioning of the patient's head for a medical procedure.

In some embodiments, the head pack support assembly may include one or more sensors to alert a caregiver that the panel is open. In some embodiments, a sensor may be positioned otherwise to indicate to a caregiver that one or more portions of the head pack support assembly is in an open or closed position. In some embodiments, a sensor may be used to send a sensor signal to a control system of the bed on which the patient rests. For example, the control system may prevent the apparatus from rotating from prone to supine position when the panel is an open position.

Figure 6:
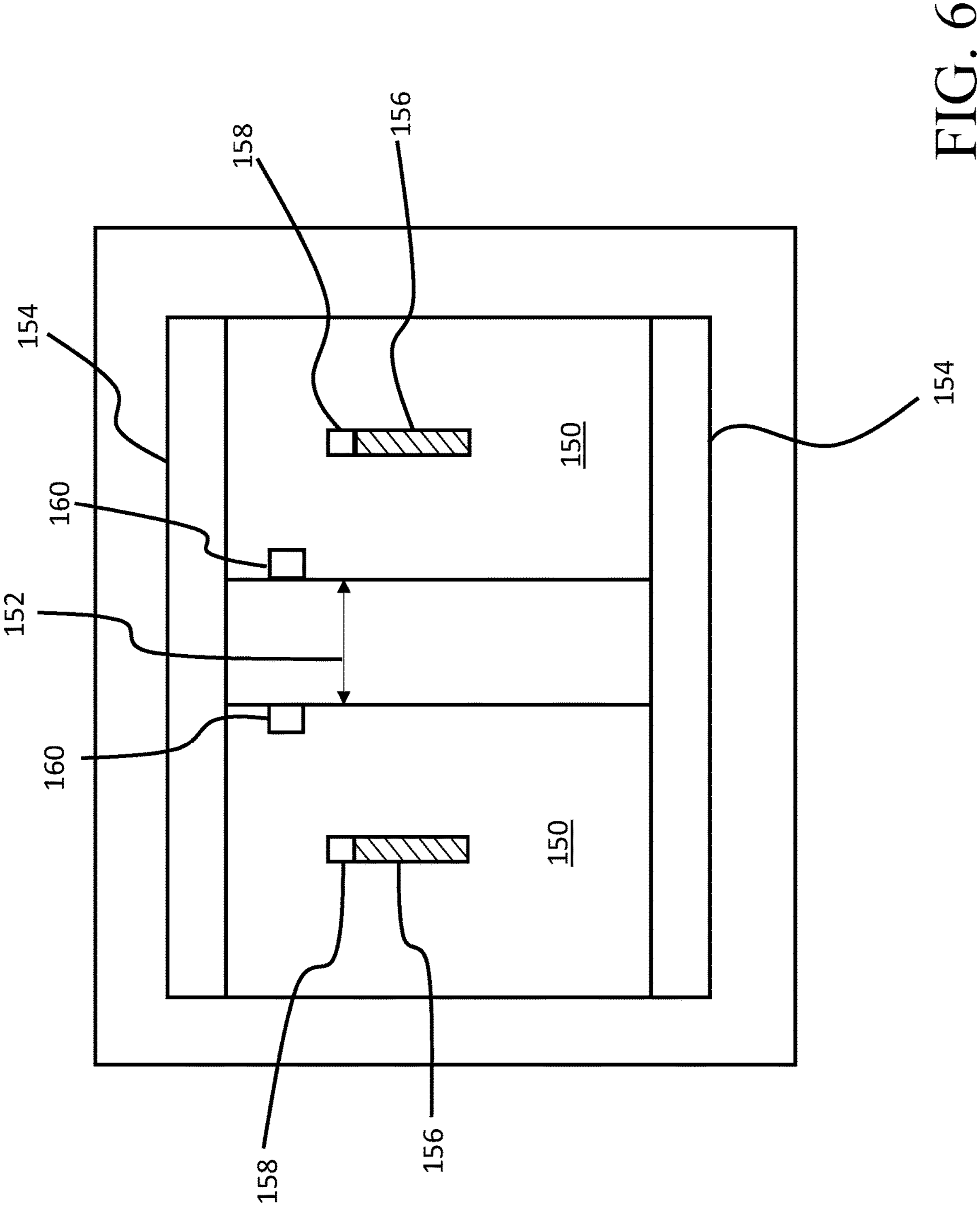
FIG. 6 illustrates a head support assembly shown in a prone or face down position and having sliding panels an open position.

FIG. 6 shows an embodiment in which the panel comprises one or more sliding panels 150. The sliding panels 150 may be moved to create an opening 152 through which the patient's head may be accessed. The sliding panels may move on one or more guide rails 154 provided in the chassis. For example, the panels may include a pull pin (not shown) that is designed to seat within a corresponding hole of the guide rail so as to limit a degree of travel and to lock the panels in a suitable position, such as a position that provides access to the patient but still maintains the patient's head in a secured position. In one embodiment, the sliding panels may include a handle 156 positioned so that a caregiver may use the handle to manually open the door. Each handle may include a knob 158 that may be pulled by a user so as to retract the pin so as to allow the user to slide the panels in the guide rail. When the panel is moved along the guide rail to a suitable position the pin may seat within a corresponding hole in the guide rail. In some embodiments, one or more sensors 160 may be used to indicate whether the sliding panel is open or shut. In other embodiments, the panel may comprise one or more doors coupled to the chassis by hinges.

It is an objective of some embodiments herein to provide a support system for securing a patient when the patient is suspended in a prone position or otherwise being rotated over some angular range. The support system includes a head support pack assembly that is uniquely designed to safely provide access to the patient while supporting the patient in a prone or otherwise rotated position. The support system may comprise a head support pack assembly that is adjustable between a closed position and an open position, the patient being safely supported in both the closed and open position.

It is an objective of some embodiments herein to provide a head support pack assembly that is adjustable between a working or therapeutic position and a stowed position. For example, a support pack assembly may be stowable without having to detach the assembly from a rotatable frame upon which the support pack assembly may be attached.

It is an objective of some embodiments herein to provide a head support pack assembly that includes a posterior head support that may be adjusted between a closed and an open access position. The support pack assembly may safely support a patient even when in an open access position. For example, if the patient is inadvertently left with the posterior head support in an open access the patient may still be safely supported, even if the patient is inadvertently rotated. Still in other designs, a head support pack assembly may be designed for purposeful rotation with a posterior head support in an open yet secured position.

It is an objective of some embodiments herein to provide a head support pack assembly that allows a posterior portion of a head support to be opened so as to provide relief of "pre-load" pressure initiated during head pack placement, provide access and visibility for assessment of skin or potential placement/adjustment of monitoring devices, and provide ventilation for comfort cooling. In some embodiments, a support pack assembly may be designed to be supported when in an open access position so that improved ventilation cooling is allowed over both the head and neck region of the patient and the patient's face.

Although the foregoing specific details describe various embodiments, persons of ordinary skill in the art will recognize that various changes may be made in the details of the disclosed subject matter without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that the disclosed subject matter is not to be limited to the specific details shown and described herein.

What is claimed is:

1. A therapeutic bed comprising:

a frame configured to rotate a patient between a supine position and a prone position;

a chassis coupled to the frame, the chassis being configured to support the head of the patient; and a panel comprising a first end and a second end, the panel being translatably and pivotably coupled to the chassis so as to permit movement of the panel between a closed position and an open position;

the panel in the closed position being positioned so as to support the posterior of a supine patient's head between the first end and the second end of the panel;

the panel in the open position being positioned with respect to the chassis so as to support the posterior of the supine patient's head at the first end of the panel.

2. The therapeutic bed of claim 1, the panel being translatably and pivotably coupled to the chassis at or near the first end of the panel, and the panel further being pivotably coupled to the chassis by a link positioned between the first end and the second end of the panel.

3. The therapeutic bed of claim 2, said link having a first end pivotably coupled to the chassis and a second end pivotably coupled to the panel.

4. The therapeutic bed of claim 3 further comprising a pull pin securely and releasably coupling the panel to the chassis.

5. The therapeutic bed of claim 1 further comprising:

a flexible material coupled to the chassis and disposed so as to partially span a gap formed when the panel is oriented in the open position.

6. The therapeutic bed of claim 5, the flexible material comprising a strap or a net.

7. The therapeutic bed of claim 1 further comprising an elastic member coupled to the chassis and to the panel so as to urge the panel to the closed position.

8. The therapeutic bed of claim 7, the elastic member comprising a spring disposed so as to provide elastic force along a path of the translatable coupling or about a point of first pivotable coupling.

9. The therapeutic bed of claim 1 further comprising:

a sensor disposed to sense when the panel is in the open position;

an electronic control system, the electronic control system being configured to receive a signal from the sensor;

the electronic control system being configured to provide a warning when the frame is rotated while the panel is in the open position.

10. A support pack assembly configured for supporting a patient's head during patient rotation, the support pack assembly comprising:

a chassis being configured for coupling to a frame of a therapeutic bed, the frame being configured to rotate a patient between a supine position and a prone position; and a posterior head panel having a first end and a second end, the posterior head panel being adjustably coupled to the supporting chassis so as to allow for adjustment of the posterior head panel between a closed position and an open position;

the patient's head being supported when the patient is positioned in the prone position in each of said closed position and said open position, the posterior head panel being configured in the open position so as to support the patient's head if the patient is rotated from the prone position to the supine position.

11. The support pack assembly of claim 10 further comprising a sensor for detecting if the posterior head panel is in at least one of an open or a closed position.

12. The support pack assembly of claim 11 further comprising a control system locking the bed from rotating from the prone to the supine position when the posterior head panel is an open position.

13. A therapeutic apparatus for supporting a patient during rotation, the therapeutic apparatus comprising:

a rotatable patient support frame; and a support pack assembly including a front support pack for constraining the patient's head, the support pack assembly being configured for connection to the rotational support frame and configured for supporting a patient's head during patient rotation, the support pack assembly comprising:

a chassis; and a posterior head panel configured to support a posterior portion of the patient's head when the patient is positioned in a supine position, the posterior head panel being adjustably mounted to the supporting chassis so as to allow for adjustment between a closed position and an open position;

wherein adjustment of the posterior head panel to the open position reduces pressure applied on the patient's face by the front support pack when the patient is held in a prone position.

14. The therapeutic apparatus of claim 13 further comprising a sensor for detecting if the posterior head panel is in at least one of an open or a closed position.

15. The therapeutic apparatus of claim 14 further comprising a control system locking the bed from rotating from prone to supine position when the posterior head panel is an open position.

16. The support pack assembly of claim 10 wherein the first end of the posterior head panel in the open position is positioned near to a posterior portion of the patient's head or in contact with the posterior portion of the patient's head when the patient is positioned in the prone position thereby positioning the first end of the posterior head panel for supporting the patient's head if the patient is rotated from the prone position to the supine position.

17. The support pack assembly of claim 16 wherein the second end of the posterior head panel is pivoted away from the chassis when the posterior head panel is in the open position.

18. The support pack assembly of claim 10 the posterior head panel being translatably and pivotably coupled to the chassis so as to allow for the adjustment of the posterior head panel between the closed position and the open position.

19. The support pack assembly of claim 10 the posterior head panel being translatably and pivotably coupled to the chassis at or near the first end of the posterior head panel using a pin engaged with a slot formed in the chassis.

20. The support pack assembly of claim 10, the posterior head panel being translatably and pivotably coupled to the chassis at or near the first end of the panel;

wherein the first end of the posterior head panel is positioned in contact with or adjacent to a posterior portion of the patient's head and the second end of the posterior head panel is pivoted away from the chassis when the posterior head panel is positioned in the open position and the patient is positioned in the prone position.

21. The support pack assembly of claim 10 the posterior head panel being translatably and pivotably coupled to the chassis at or near the first end of the posterior head panel using a pin engaged with a slot formed in the chassis and the posterior head panel being further coupled to the chassis through a link, the link being pivotably coupled at a first end of the link to the chassis and at a second end of the link to the posterior head panel.

22. The support pack assembly of claim 10, the support pack assembly including a front support pack, the patient's head being supported by the front support pack when the patient is positioned in the prone position.

* * * * *